US 11,893,098 B2

(12) United States Patent
Lawrenson et al.

(10) Patent No.: US 11,893,098 B2
(45) Date of Patent: *Feb. 6, 2024

(54) AUTHENTICATING A USER SUBVOCALIZING A DISPLAYED TEXT

(71) Applicant: Telefonaktiebolaget LM Ericsson (publ), Stockholm (SE)

(72) Inventors: Matthew John Lawrenson, Bussigny (CH); Lars Andersson, Solna (SE); Till Burkert, Huddinge (SE); Harm Stefan Cronie, Echallens (CH); Jacob Ström, Stockholm (SE); Jan Jasper Van Den Berg, Lausanne (CH)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 215 days.

This patent is subject to a terminal disclaimer.

(21) Appl. No.: 17/460,778

(22) Filed: Aug. 30, 2021

(65) Prior Publication Data

US 2021/0390167 A1    Dec. 16, 2021

Related U.S. Application Data

(63) Continuation of application No. 16/466,464, filed as application No. PCT/EP2016/080950 on Dec. 14, 2016, now Pat. No. 11,132,429.

(51) Int. Cl.
*G06F 21/00* (2013.01)
*G06F 21/32* (2013.01)
(Continued)

(52) U.S. Cl.
CPC ............ *G06F 21/32* (2013.01); *G06F 21/316* (2013.01); *H04W 12/065* (2021.01)

(58) Field of Classification Search
CPC .... G06F 21/32; G06F 21/316; H04W 12/065; G10L 17/24; G10L 17/10; G10L 15/24; H04L 63/0861
See application file for complete search history.

(56) References Cited

U.S. PATENT DOCUMENTS 6,421,453 B1   7/2002  Kanevsky et al.
6,487,531 B1   11/2002 Tosaya et al.
(Continued)

FOREIGN PATENT DOCUMENTS

EP     2 843 586 A1       3/2015
WO     WO 2008/095768 A1  8/2008

OTHER PUBLICATIONS

International Search Report and Written Opinion of the International Searching Authority for International Application No. PCT/EP2016/080950 dated Apr. 26, 2017.
(Continued)

*Primary Examiner* — Jeffrey C Pwu
*Assistant Examiner* — William A Corum, Jr.
(74) *Attorney, Agent, or Firm* — Sage Patent Group

(57) ABSTRACT

A computing device (200) for authenticating a user (110) is provided. The computing device is operative to display a first text (131) to the user, acquire a representation of the user subvocalizing a part of the first text, derive a user phrasing signature from the acquired representation, and authenticate the user in response to determining that the user phrasing signature and a reference phrasing signature fulfil a similarity condition. Optionally, the computing device may be further operative to determine if the user is authorized to read the first text. Further optionally, the computing device may be operative to reveal obfuscated parts of the first text in response to determining that the user is authorized to read the first text, or to discontinue displaying the first text, or to obfuscate at least part of the first text, in response to
(Continued)

401
└─These are example sentences, can you read them? Thank you.

402
└─These are exam-ple sen-tenc-es, can you read them? Thank you.

403

404 determining that the user is not authorized to read the first text.

32 Claims, 8 Drawing Sheets

(51) Int. Cl.
 *G06F 21/31* (2013.01)
 *H04W 12/065* (2021.01)

(56) References Cited

U.S. PATENT DOCUMENTS

| | | | |
|---|---|---|---|
| 9,564,123 | B1 | 2/2017 | Mont-Reynaud et al. |
| 2002/0103656 | A1* | 8/2002 | Bahler .................... G10L 15/26 706/14 |
| 2008/0195395 | A1 | 8/2008 | Kim et al. |
| 2010/0036657 | A1 | 2/2010 | Morisaki et al. |
| 2012/0075184 | A1 | 3/2012 | Madhvanath |
| 2012/0242865 | A1 | 9/2012 | Vartanian et al. |
| 2012/0254941 | A1* | 10/2012 | Levien .................... G06F 21/32 726/3 |
| 2014/0278443 | A1 | 9/2014 | Gunn et al. |
| 2015/0056951 | A1 | 2/2015 | Talwar et al. |
| 2016/0117516 | A1* | 4/2016 | Jin ........................... G06F 21/30 726/28 |
| 2016/0372111 | A1 | 12/2016 | VanBlon et al. |
| 2017/0098447 | A1 | 4/2017 | Fu |
| 2017/0308739 | A1 | 10/2017 | Wang et al. |
| 2018/0113675 | A1 | 4/2018 | Rutherford et al. |
| 2018/0137865 | A1 | 5/2018 | Ling |
| 2019/0088158 | A1* | 3/2019 | Remo .................. G09B 17/003 |
| 2019/0102531 | A1* | 4/2019 | Li ........................... G10L 17/06 |

OTHER PUBLICATIONS

Tanja Schultz, "ICCHP Keynote: Recognizing Silent and Weak Speech Based on Electromyography," Computers Helping People with Special Needs, pp. 595-604, Jul. 14, 2010.
Luciana Ferrer et al., "Modeling Duration Patterns for Speaker Recognition," Eurospeech 2003—Geneva, pp. 2017-2020, Sep. 1, 2003.
Roland H.C. Yap et al., "Physical Access Protection using Continuous Authentication," 2008 IEEE Conference on Technologies for Homeland Security, pp. 510-512, Jun. 2008.
Andreas Bulling et al., "Robust Recognition of Reading Activity in Transit Using Wearable Electrooculography," International Conference on Pervasive Computing, pp. 19-37, 2008.
Mohamed A. Elgharib et al., "Video Magnification in Presence of Large Motions," IEEE Conference on Computer Vision and Pattern Recognition (CVPR), pp. 1-9, 2015.
Neal Wadhwa et al., "Phase-Based Video Motion Processing," ACM Transactions on Graphics, vol. 32, Issue 4, Article No. 80, pp. 1-9, Jul. 2013.
Dachuan Liu et al., "Exploiting Eye Tracking for Smartphone Authentication," International Conference on Applied Cryptography and Network Security (ACNS), pp. 457-477, 2015.
Tao Feng et al., "Continuous Mobile Authentication using Touchscreen Gestures," 2012 IEEE Conference on Technologies for Homeland Security (HST), pp. 451-456, 2012.
Hao-Yu Wu et al., "Eulerian Video Magnification for Revealing Subtle Changes in the World," ACM Transactions on Graphics, vol. 31, Issue 4, Article No. 65, pp. 1-8, Jul. 2012.
Romain Giot et al., "Keystroke Dynamics Authentication for Collaborative Systems," International Symposium on Collaborative Technologies and Systems, pp. 172-179, 2009.

* cited by examiner

Fig. 4
401
— These are example sentences, can you read them? Thank you.
402
— These are exam-ple sen-tenc-es, can you read them? Thank you.
403
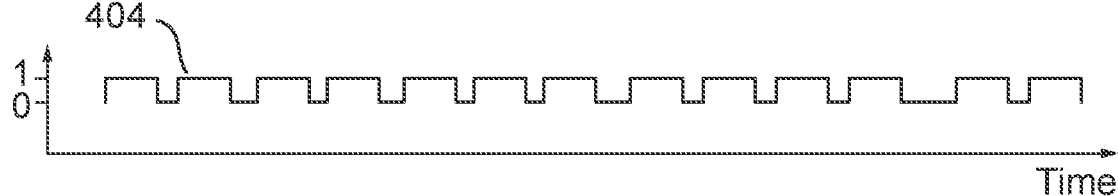
404

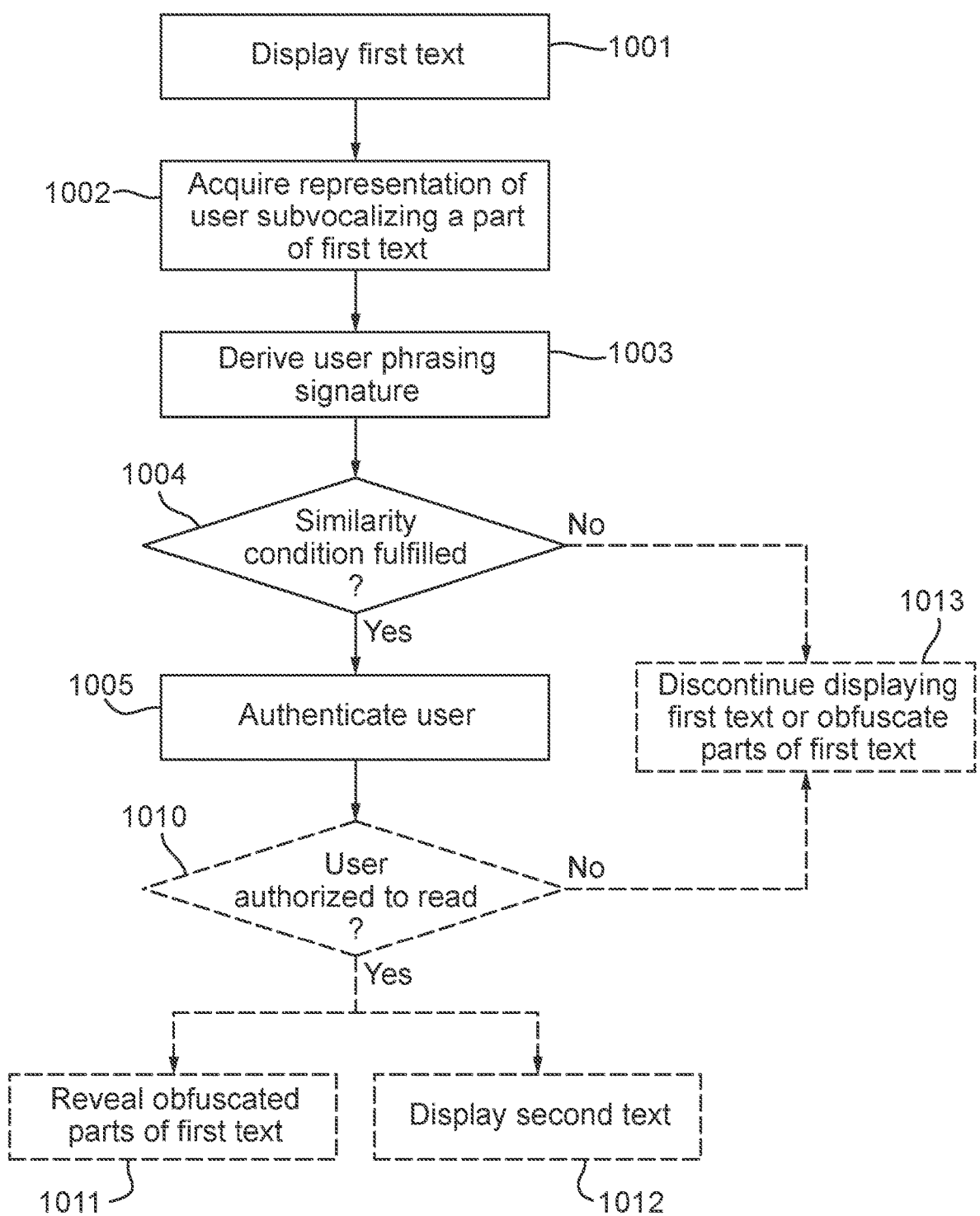

AUTHENTICATING A USER SUBVOCALIZING A DISPLAYED TEXT

CROSS REFERENCE TO RELATED APPLICATIONS

This application is a continuation of U.S. application Ser. No. 16/466,464, filed Jun. 4, 2019, which is a 35 U.S.C. § 371 national stage application of PCT International Application No. PCT/EP2016/080950, filed on Dec. 14, 2016, the disclosures and contents of which are incorporated by reference herein in their entireties.

TECHNICAL FIELD

The invention relates to a computing device for authenticating a user of the computing device, a method of authenticating a user of a computing device, a corresponding computer program, and a corresponding computer program product.

BACKGROUND

Many types of documents, such as any proprietary information, documentation of unpatented technology, legal or business documents, oftentimes require a solution for controlling who can access their information, i.e., whether a person is authorized to read a certain document. Typically, this situation occurs when a user accesses a document through a computing device, such as a computer, a tablet, or a smartphone. Currently, such documents are typically protected by passwords or PIN codes, or solutions relying on security cards. Also known are systems relying on biometric information.

Password authentication relies on verification of a user by comparison of a remembered word or a string of characters, the password or passphrase, against a version stored with the protected document or in a database.

Authentication based on security card systems, often combined with PINs, relies on the user carrying a unique card which is required when accessing a protected document through a computing device.

Static biometric identification is the verification of a user by comparison of unique biological information, such as iris patterns or fingerprints, against reference stored information. These can be used for single-challenge or continuous authentication ("Physical Access Protection using Continuous Authentication", by R. H. C. Yap, T. Sim, and G. X. Y. Kwang, 2008 IEEE Conference on Technologies for Homeland Security, pages 510-512, IEEE, 2008).

Behavioral biometric identification utilizes pattern analysis software for recognizing user specific behavior or device interaction signatures, which may be used for authenticating a user based on use patterns while typing on a keyboard ("Keystroke dynamics authentication for collaborative systems", by R. Giot, M. El-Abed, and C. Rosenberger, International Symposium on Collaborative Technologies and Systems (CTS '09), pages 172-179, IEEE, 2009) or controlling a touch-based user-interface ("Continuous mobile authentication using touchscreen gestures", by T. Feng, Z. Liu, K.-A. Kwon, W. Shi, B. Carbunar, Y. Jiang, and N. Nguyen, 2012 IEEE Conference on Technologies for Homeland Security, pages 451-456, IEEE, 2013).

It is also known to authenticate users based on eye tracking technology ("Exploiting Eye Tracking for Smartphone Authentication", by D. Liu, B. Dong, X. Gao, and H. Wang, Applied Cryptography and Network Security, volume 9092 of the series Lecture Notes in Computer Science, pages 457-477, Springer, 2015). Such solutions also provide the possibility to track and ensure that text has actually been read, either based on electrooculography ("Robust Recognition of Reading Activity in Transit Using Wearable Electrooculography", by A. Bulling, J. A. Ward, H. Gellersen, and G. Tröster, Proceedings of the 6th International Conference on Pervasive Computing, pages 19-37, Springer, 2008) or video methods ("Exploiting Eye Tracking for Smartphone Authentication", by D. Liu, B. Dong, X. Gao, and H. Wang, Applied Cryptography and Network Security, volume 9092 of the series Lecture Notes in Computer Science, pages 457-477, Springer, 2015). This may, e.g., be desirable for certain document types, such as medical instructions or legal documents.

The known solutions for controlling access of users of a computing device to protected documents have numerous disadvantages. For instance, user authentication systems relying on passwords suffer from security weaknesses such as data breaches or brute force guessing. In addition, passwords are easily forgotten by users, which introduces additional security issues from repeated use of the same passwords, manual storage of passwords, and security issues associated with password reset or recovery systems. Moreover, the rise of small and simple keyboards on smartphones and portable devices also reinforces the use of simple passwords as users favor brevity due to increased effort in typing.

Authentication systems relying on static biometric information are vulnerable to data breaches and have the disadvantage that once the biometric data has been compromised it is difficult to change, and that particular biometric is no longer useful in an authentication scheme.

Authentication systems which are based on behavioral biometrics provide an increased level of security, as user patterns in keystrokes or touch gestures are more difficult to steal or reproduce than fingerprints or iris patterns. They do, however, rely on particular interactions of the user with a computing device, such as typing on a keyboard or using a touch-based user-interface, and cannot be utilized for user activities such as reading text. Accordingly, they cannot be utilized for continuous authentication of a user reading text, e.g., a confidential document.

SUMMARY

It is an object of the invention to provide an improved alternative to the above techniques and prior art.

More specifically, it is an object of the invention to provide an improved authentication of a user of a computing device while reading text which is displayed by the computing device. In particular, it is an object of the invention to provide an improved continuous authentication of the user.

The text may, e.g., be a protected document, or a part thereof. In the present context, a protected document is a document with limited read access, such as a legal document, a business document, a document comprising technical information, e.g., unpatented technology, and the like.

These and other objects of the invention are achieved by means of different aspects of the invention, as defined by the independent claims. Embodiments of the invention are characterized by the dependent claims.

According to a first aspect of the invention, a computing device for authenticating a user of the computing device is provided. The computing device comprises processing means which is operative to display a first text to the user, acquire a representation of the user subvocalizing at least a part of the first text, derive a user phrasing signature from the acquired representation, and authenticate the user in response to determining that the user phrasing signature and a reference phrasing signature fulfil a similarity condition.

According to a second aspect of the invention, a method of authenticating a user of a computing device is provided. The method is performed by the computing device and comprises displaying a first text to the user, acquiring a representation of the user subvocalizing at least a part of the first text, deriving a user phrasing signature from the acquired representation, and authenticating the user in response to determining that the user phrasing signature and a reference phrasing signature fulfil a similarity condition.

According to a third aspect of the invention, a computer program is provided. The computer program comprises computer-executable instructions for causing a device to perform the method according to an embodiment of the second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

The invention makes use of an understanding that an improved authentication of a user of a computing device in situations when the user is reading text which is displayed by the computing device, may be achieved based on subvocalization.

Subvocalization is the "internal speech" while reading a text and is characterized by minute movements of the larynx and other speech muscles, as well as other body parts, which are imperceptible to the human eye but detectable by technical means. By acquiring a representation of the user subvocalizing the text he or she is reading, and deriving a user phrasing signature from the acquired representation which subsequently is compared to a reference phrasing signature, the user can be authenticated while reading the text. The reference phrasing signature represents the expected phrasing for the user and may be derived from previously acquired representations of the user subvocalizing text, e.g., during a training or learning phase. The reference phrasing signature may optionally be updated when the computing device is used by the user, i.e., when the user is reading text displayed by the computing device. To this end, the user is authenticated based on his or her phrasing when reading text, i.e., cadence, duration of syllables, and durations of pauses which are related to punctuation marks. Typically, the phrasing when reading text is individual for each user, as there are differences in subvocal activity between users, reading speed, general lexical knowledge, e.g., the knowledge of irregular words and/or how to pronounce them, the knowledge of words related to a field of expertise, and language proficiency.

Embodiments of the invention are advantageous since people increasingly prefer reading documents which are displayed by a computing device, either on a built-in screen or an external screen, rather than a printed paper copy. The computing device may, e.g., be a mobile phone, a mobile terminal, a smartphone, a tablet, a laptop, an e-book reader, a television, or a media player, which typically are provided with built-in screens, oftentimes of touchscreen type. Alternatively, the computing device may be a personal computer which is operatively connected to an external a computer display.

Advantageously, embodiments of the invention enable continuous authentication, i.e., they allow to continuously, or at regular or irregular intervals, verify the identity of the user. The user is authenticated in response to determining that the user phrasing signature and the reference phrasing signature fulfil a similarity condition. This is similar to authentication schemes based on biometric authentication, e.g., involving fingerprints, voice recognition, iris patterns, or behavioral biometric identification, which all rely on comparing a sample or behavioral pattern obtained from the user and assessing whether the obtained sample or behavioral pattern is in sufficient agreement with a reference sample or a reference behavioral pattern, respectively.

According to an embodiment of the invention, the representation of the user subvocalizing at least a part of the first text is acquired by acquiring nerve signals captured from a throat of the user subvocalizing the part of the first text, and deriving the representation of the user subvocalizing at least a part of the first text as a representation of the nerve signals. The nerve signals are acquired from one or more sensors, or electrodes, operatively connected to the computing device, in particular electromyographical (EMG) sensors or electrodes. As a person reads a text, even without vocalizing it audibly, they still make a variety of internal and external motions which are triggered by nerve signals controlling the muscles of the person. Both the nerve signals and the resulting motions, which typically are imperceptible to the human eye, are correlated with the text and can be detected. In particular, a single subvocal movement has strong correlations to a single syllable, and the number of syllables per word can be detected by measuring the speed of subsequent subvocal movements. Moreover, when they follow each other with a speed above a certain threshold, this indicates that the subsequent movements belong to the same word. When the detected subvocal activity is below a certain threshold, it can be concluded that the user makes a pause since he or she has reached a punctuation mark in the text. These internal and external motions include muscle movements which are related to the ones the person would make to audibly create the sounds, such as the movement of vocal chords, and may also include associated movements the person would make, e.g., sway due to the music and modified breathing patterns. Examples of these motions are motions of vocal chords, lips, tongue, jaw, neck, other body parts such as heads and shoulders, and motions related to breathing.

According to another embodiment of the invention, the representation of the user subvocalizing at least a part of the first text is acquired by acquiring a video sequence of the user subvocalizing the part of the first text, magnifying motions of one or more body parts of the user, and deriving the representation of the user subvocalizing at least a part of the first text as a representation of the magnified motions. The motions of the one or more body parts are correlated with the subvocalized part of the first text. The representation of the magnified motions may, e.g., be derived using one or more metrics quantifying the motions of the lips, throat, or other body parts, of the user. The video sequence is acquired from a camera operatively connected to the computing device, e.g., a camera which is comprised in the computing device, such as a front-facing camera in a smartphone or tablet. Alternatively, an external camera, such as a web cam which is connected to the computing device via an interface may be used. The camera captures motions of the one or more body parts of the user, such as the user's lips, throat, mouth, nose, face, neck, or shoulders. The motions may, e.g., be magnified by means of Eulerian Video Magnification (EVM) or Lagrangian techniques which are described in further detail below. Acquiring the representation of the melody subvocalized by the user by means of a video capturing the user subvocalizing the melody, and processing the video to magnify motions which are correlated with the subvocalized text, is an alternative to utilizing EMG sensors for capturing nerve signals.

According to an embodiment of the invention, the user phrasing signature is derived from the acquired representation by identifying syllables and pauses in the acquired representation, determining respective durations of the identified syllables and pauses, and deriving the user phrasing signature as a sequence of the determined durations of the syllables and pauses. That is, the acquired representation is transformed into a signal, or a time-dependent function, representing the phrasing of the subvocalized first text, or a part thereof.

According to an embodiment of the invention, the reference phrasing signature is derived by identifying syllables and pauses in the first text, acquiring reference durations of syllables and pauses, and deriving the reference phrasing signature as a sequence of the reference durations of the identified syllables and pauses. Preferably, the reference durations of syllables and pauses are derived from acquired representations of the user subvocalizing text by identifying syllables and pauses in the acquired representations, determining respective durations of the identified syllables and pauses, and storing the determined durations of syllables and pauses as the reference durations of syllables and pauses. Advantageously, the reference durations may be derived from previously acquired representations of the user subvocalizing text, e.g., during a learning or training phase. Optionally, the reference durations of syllables and pauses, and consequently the reference phrasing signature, may be dependent on a type of text. This is advantageous in that user subvocalization typically depends on the type of the first text, since people tend to read different types of texts with different phrasing. For instance, technical or legal texts are oftentimes read more carefully, and consequently slower, than, e.g., news articles.

According to an embodiment of the invention, it is determined that the user phrasing signature and the reference phrasing signature fulfil a similarity condition by calculating a correlation between the user phrasing signature and at least a consecutive part of the reference phrasing signature, and determining that the user phrasing signature and the reference phrasing signature fulfil the similarity condition if the calculated correlation exceeds a first threshold value. The consecutive part of the reference phrasing signature corresponds to the part of the first text which is subvocalized by the user. The first threshold value may be configured either by the user, a manufacturer of the computing device, or a provider of a software application or a service relying on user authentication in accordance with embodiments of the invention, and reflects a measure of correlation between the user phrasing signature and the part of the reference phrasing signature which corresponds to the subvocalized part of the first text, and which is commensurate with establishing, to a desired certainty, that the user has read and subvocalized the part of the first text. Optionally, the correlation may be calculated between the user phrasing signature and the entire reference phrasing signature, and it is further determined that the user has read the first text substantially in its entirety if the calculated correlation exceeds a second threshold value. Similar to the first threshold value, the second threshold value may be configured either by the user, a manufacturer of the computing device, or a provider of a software application or a service relying on user authentication in accordance with embodiments of the invention, and reflects a measure of correlation between the user phrasing signature and the entire reference phrasing signature, and is commensurate with establishing, to a desired certainty, that the user has read the entire first text. Advantageously, this may be used for concluding that the user actually has read the text, e.g., a legal document, an agreement for using a service provided over the Internet or a computer program, or medical information provided with a drug, rather than just gazing at it.

According to an embodiment of the invention, it is further determined, in response to authenticating the user, if the user is authorized to read the first text. This is advantageous in scenarios in which the first text, and optional further texts which are related to the first text, such as legal documents, business documents, agreements, or the like, e.g., is/are confidential. Typically, only a limited group of users is allowed to read such texts. Preferably, it is determined if the user is authorized to read the first text based on permission information associated with the first text. The permission information may, e.g., be encoded as metadata and stored in a document comprising the first text, or stored separately in a database.

According to an embodiment of the invention, obfuscated parts of the first text are revealed in response to determining that the user is authorized to read the first text. For instance, some words or parts of the first text may obfuscated, e.g., blurred or blocked, when the first text is displayed. Once the user is authenticated as a user which is authorized to read the first text, the obfuscated parts are revealed.

According to an embodiment of the invention, displaying the first text is discontinued in response to determining that the user is not authorized to read the first text, or in response to determining that the user phrasing signature and the reference phrasing signature fail to fulfil the similarity condition. In other words, the first text, which may be confidential, is displayed until an attempt to authenticate the user has failed, or until it has been determined that the authenticated user is not authorized to read the first text. Alternatively, instead of discontinuing displaying the first text, the first text, or parts thereof, may be obfuscated in response to determining that the user subvocalization signature and the reference subvocalization signature fail to fulfil the similarity condition, or that the user is not authorized to read the first text.

According to an embodiment of the invention, a second text is displayed in response to determining that the user is authorized to read the first text. For instance, the first text and the second text may both be parts of a protected document, such as a legal agreement. This is advantageous in scenarios where the first part is not confidential, whereas the second part is confidential and is only displayed if the user is authenticated, while reading the first text, and is authorized to read the document comprising the first and the second text. Preferably, the second text is displayed in response to detecting that the user subvocalizes a closing part of the first text, i.e., is about to finish reading the first text.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 4 illustrates a text, its corresponding phrasing graph, and its corresponding phrasing signature, in accordance with embodiments of the invention.

FIG. 10 shows a method of authenticating a user of a computing device, in accordance with embodiments of the invention.

Figure 1:
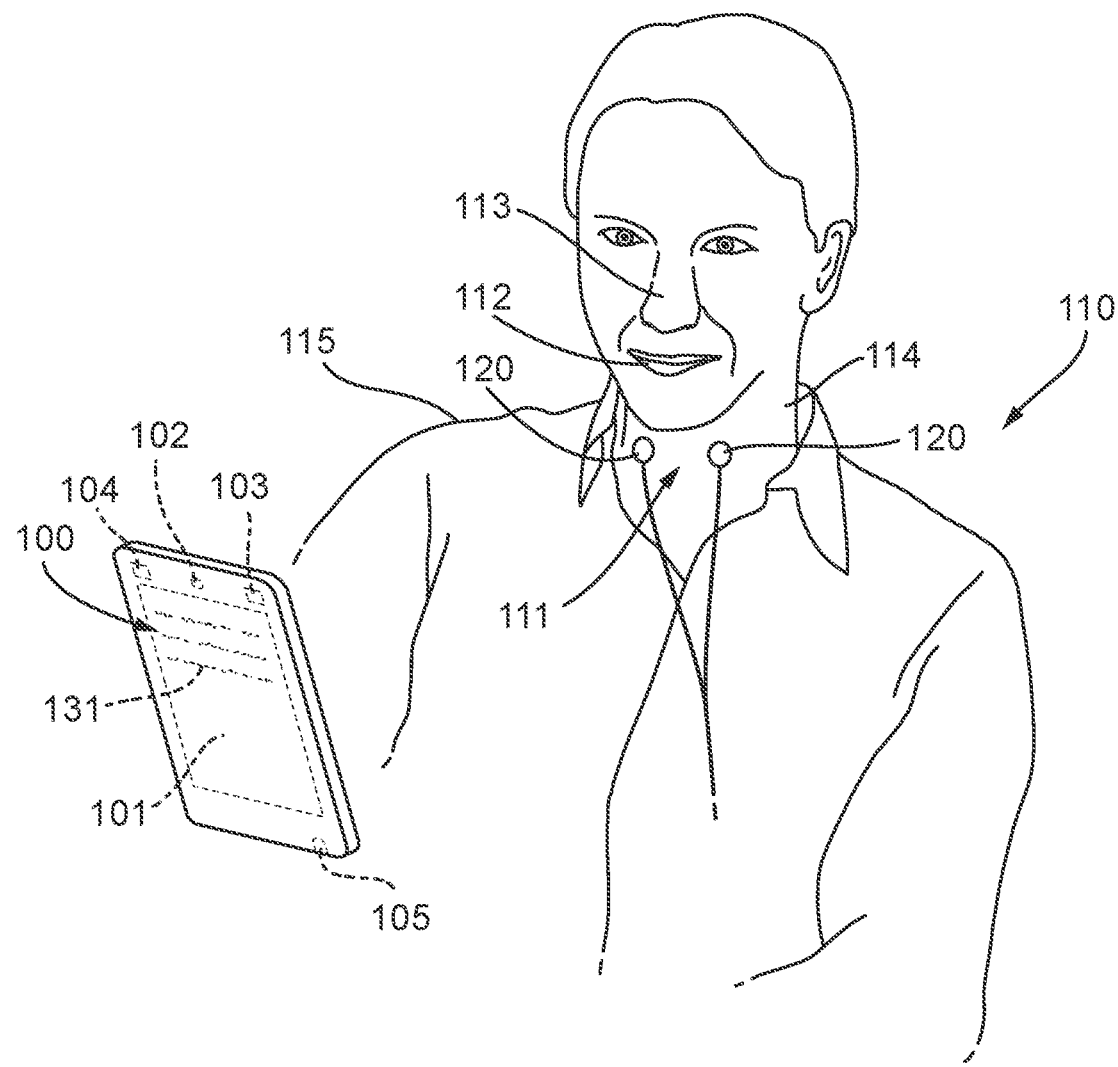
FIG. 1 shows a computing device for authenticating a user based on a text subvocalized by the user, in accordance with an embodiment of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

The embodiments of the invention described herein make use of an understanding that a user of a computing device can be authenticated based on subvocalizing a text he or she is reading. Subvocalization is the "internal speech" while reading a text and is characterized by minute movements of the larynx and other speech muscles, as well as other body parts, which are imperceptible to the human eye but detectable by technical means. As a person reads a text, although they do not make audible noise, they still make a variety of internal (e.g., vocal chords) and external (e.g., lips) motions which can be detected, albeit being imperceptible to the human eye. These motions include muscle movements which are related to the ones the person typically would make to create audible sounds, and which consequently are correlated with the text subvocalized by the user. To give some examples, the movements include:

Lip motions: Each time a person says a syllable their lips move. The pronunciation of each syllable requires the user to move their lips. For instance, pronouncing the word "sen-tence" requires to first pronounce "sen" and then again to pronounce "tence".

Throat movement: The utterance of a syllable also requires the user to change the shape of their vocal chords. This is done by moving the muscles that control the vocal chords, and this movement in turn moves the surface of the user's throat.

Pauses: A person who is reading pauses in between words, and also at punctuation points such as comma, question mark, and full stop. The person may also breath during a pause, resulting in modified breathing patterns.

Uncertainty: If a person is pronouncing a word they are less certain about it may take longer as they need cognitive effort to work out what the word is.

In addition, a person who is reading may also sway to the text he/she is reading, in particular if the text is lyrics of a piece of music or poetry.

Advantageously, by acquiring a representation of the user subvocalizing the text he or she is reading, and deriving a user phrasing signature from the acquired representation which subsequently is compared to a reference phrasing signature, the user can be authenticated while reading the text. To this end, the user phrasing signature reflects the user's phrasing when reading a text, i.e., cadence, duration of syllables, and durations of pauses between words as well as pauses which are related to punctuation marks. Correspondingly, the reference phrasing signature reflects an expected phrasing for which is based on user-specific information obtained during a learning or training phase.

In FIG. 1, an embodiment 100 of the computing device for authenticating a user 110 of computing device 100 is shown. Computing device 100 is operative to authenticate user 110 based on a first text 131 which is displayed by computing device 100 and subvocalized by user 110 when reading first text 131. Computing device 100 is in FIG. 1 illustrated as a tablet comprising a display 101, e.g., a touchscreen, a front-facing camera 102, processing means 103, a communications module 104, and an optional interface 105 for connecting external devices, as is described further below.

Communications module 104 is operative to effect wireless communications with a Radio Access Network (RAN) or with another computing device, based on a cellular telecommunications technique such as the Global System for Mobile communications (GSM), Universal Mobile Telecommunications System (UMTS), Long Term Evolution (LTE), or any 5G standard. Alternatively, or additionally, communications module 104 may be operative to effect wireless communications through a Wireless Local Arena Network (WLAN)/Wi-Fi network.

Interface 105 for connecting external devices is in FIG. 1 illustrated as a conventional headphone jack, or headset jack, but may alternatively be embodiment as any other type of connector, such as a Lightning connector, a Universal Serial Bus (USB) connector, or the like. As yet a further alternative, interface 105 may also be a wireless interface based on technologies like coded visible or invisible light, Bluetooth, or ZigBee.

Computing device 100 is operative to display first text 131 to user 110, either using built-in display 101 or an external display which is operatively connected to computing device 100, e.g., a computer display. Computing device 100 is further operative to acquire a representation of user 110 subvocalizing at least a part of first text 131, and to derive a user phrasing signature from the acquired representation. Computing device 100 is further operative to authenticate user 110 in response to determining that the user phrasing signature and a reference phrasing signature fulfil a similarity condition.

More specifically, and with reference to FIG. 1, computing device 100 is operative to acquire the representation of user 110 subvocalizing the part of first text 131 by acquiring nerve signals which are captured from the throat 111 of user 110 when subvocalizing the part of first text 131. The nerve signals may be acquired by means of one or more EMG sensors 120, or electrodes, which are attached to throat 111, e.g., one sensor 120 on each side of the larynx, and which are operatively connected to computing device 100, e.g., via interface 105. The captured nerve signals are correlated with the part of first text 131 which user 110 subvocalizes when reading, since they control movements of the larynx and other body parts 111-115 of user 110. The nerve signals which are acquired from sensors 120 may either be received directly, e.g., as an analog electric signal, as a digitized representation of the analog sensor signal, or as a chunk of data captured by sensors 120 and delivered to computing device 100, optionally after pre-processing, either wired or wirelessly via interface 105. The representation of user 110 subvocalizing the part of first text 131 is derived as a representation of the nerve signals, and can subsequently be used for deriving the user phrasing signature, as is described further below with reference to FIG. 4.

Figure 2:
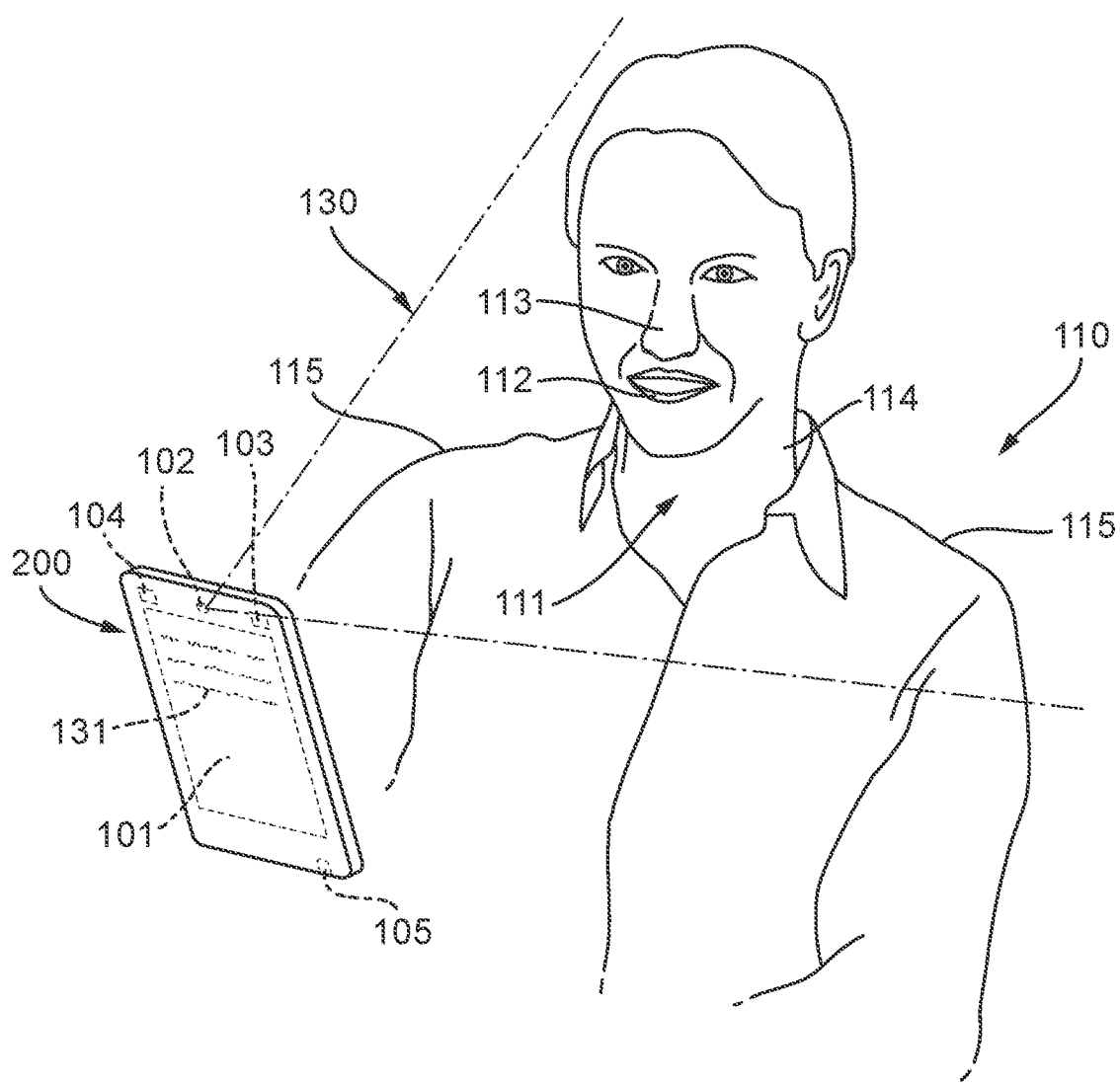
FIG. 2 shows a computing device for authenticating a user based on a text subvocalized by the user, in accordance with another embodiment of the invention.

In FIG. 2, another embodiment 200 of the computing device for authenticating a user 110 of computing device 100 is shown. Similar to computing device 100 described with reference to FIG. 1, computing device 200 comprises a display 101, e.g., a touchscreen, a front-facing camera 102, processing means 103, a communications module 104, and an optional interface 105 for connecting external devices.

In correspondence with what is described with reference to FIG. 1, computing device 200 is operative to display first text 131 to user 110, either using built-in display 101 or an external display which is operatively connected to computing device 200, e.g., a computer display. Computing device 200 is further operative to acquire a representation of user 110 subvocalizing at least a part of first text 131, and to derive a user phrasing signature from the acquired representation. Computing device 200 is further operative to authenticate user 110 in response to determining that the user phrasing signature and a reference phrasing signature fulfil a similarity condition.

In contrast to what is described with reference to FIG. 1, computing device 200 is operative to acquire the representation of user 110 subvocalizing the part of first text 131 by acquiring a video sequence of user 110 subvocalizing the part of first text 131, and magnifying motions of one or more body parts 111-115 of user 110 which are correlated with the subvocalized part of first text 131. The video sequence is acquired from a camera operatively connected to the computing device 200, such as front-facing camera 102 or an external camera operatively connected to computing device 200, e.g., a web cam or a camera mounted in a computer display. The camera has a field-of-view 130 so as to capture at least one of the user's 110 face, throat 111, mouth or lips 112, nose 113, neck 114, and shoulders 115. An example of an image of a video sequence captured by camera 102 is illustrated in FIG. 3.

More specifically, computing device 200 is operative to magnify the motions of one or more body parts 111-115 by video processing the acquired video sequence, either using EVM or by utilizing Lagrangian techniques. EVM is an image processing technique which applies a spatial decomposition followed by a temporal filter to the frames of a standard video in order to amplify very small motions which are present but typically are imperceptible to the human eye. The technique can be applied in real-time to highlight events occurring at specified temporal frequencies. For a description of EVM, see, e.g., "Eulerian Video Magnification for Revealing Subtle Changes in the World", by H.-Y. Wu, M. Rubinstein, E. Shih, J. Guttag, F. Durand, and W. Freeman (Proceedings of ACM SIGGRAPH 2012, ACM Transactions on Graphics, vol. 31, article no. 65, ACM New York, 2012). A comparison between EVM and the Lagrangian approach has been reported in "Phase-based video motion processing", by N. Wadhwa, M. Rubinstein, F. Durand, and W. T. Freeman (SIGGRAPH 2013 Conference Proceedings, ACM Transactions on Graphics, vol. 32, article no. 80, ACM New York, 2013), and it was concluded that the Eulerian approach, i.e., EVM, supports larger amplification factors at better noise performance. Whereas the Lagrangian approaches estimate the motions explicitly (so the motions themselves are amplified), EVM relies on calculating and amplifying the non-motion compensated frame differences. A solution for coping with large motions in the Lagrangian approach is reported in "Video magnification in presence of large motions" by M. A. Elgharib, M. Hefeeda, F. Durand, and W. T. Freeman (2015 IEEE Conference on Computer Vision and Pattern Recognition (CVPR), pages 4119-4127, IEEE Computer Society, 2015), and is based on defining a region-of-interest within which motions are magnified.

Figure 3:
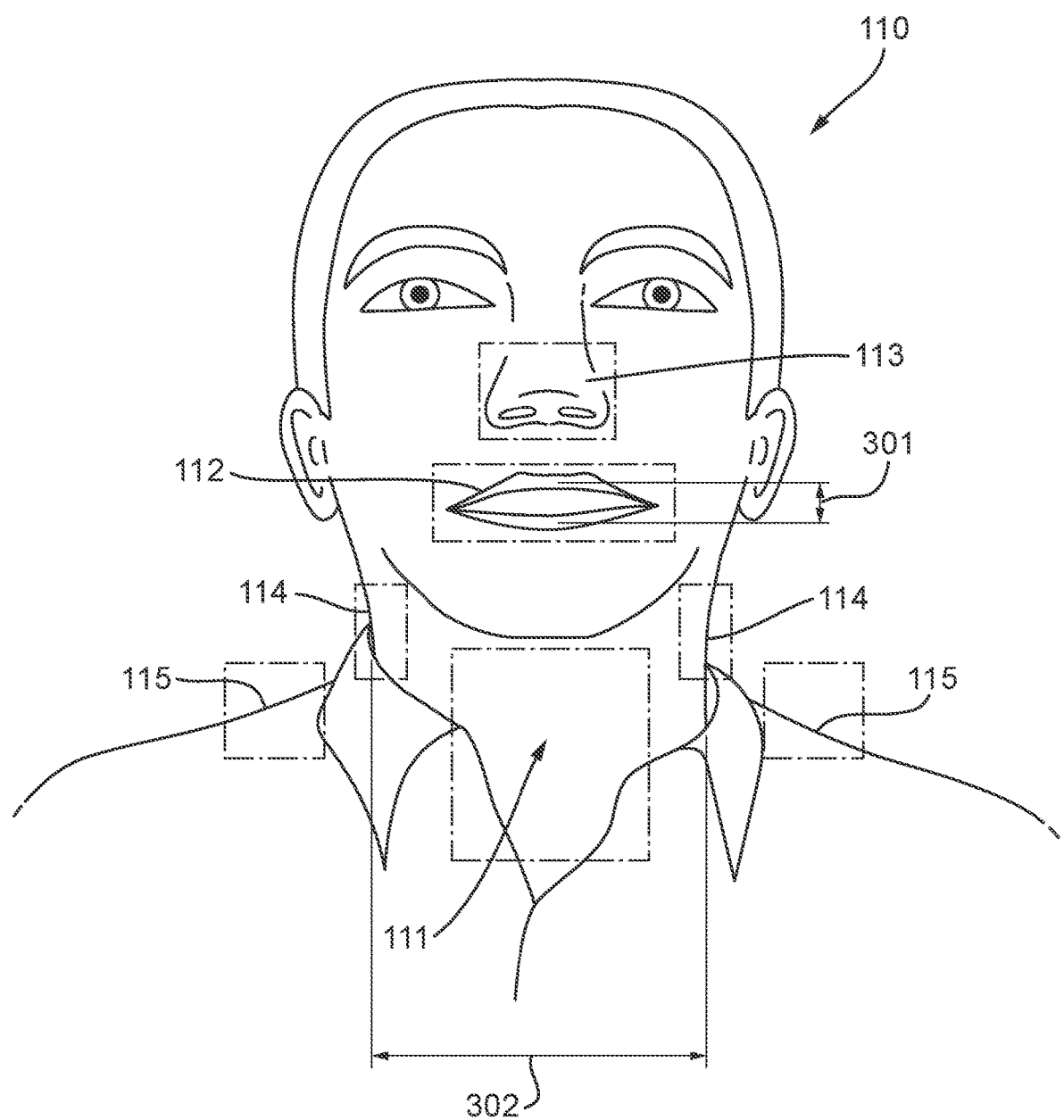
FIG. 3 exemplifies an image of a video sequence captured by a camera comprised in the embodiment of the computing device shown in FIG. 2.

Further with reference to FIGS. 2 and 3, computing device 200 is operative to derive the representation of user 110 subvocalizing the part of first text 131 as a representation of the magnified motions. For instance, the representation may be based on one or more metrics which quantify the motions of lips 112, neck 114, or other body parts, of user 110. In practice, if lips 112 are captured in the video sequence obtained from camera 102, the representation may be based on a measured distance 301, magnified by video processing, between the upper and lower lip 112 over time. As an alternative, the representation may be based on a measured width 302, magnified by video processing, of neck 114 over time. The representation of user 110 subvocalizing the part of first text 131 can subsequently be used for deriving the user phrasing signature, as is described in the following.

In FIG. 4, a text 401 is illustrated as an example for first text 131. The same text is again illustrated as text 402, with additional markers for indicating syllables and pauses due to punctuation marks. When read by user 110, text 401 can be represented as a phrasing graph 403 which graphically illustrates the phrasing which user 110 applies when reading text 401. In particular, phrasing graph 403 illustrates the duration of each syllable (indicated by "_"), the separation between syllables (indicated by "\"), which is an indication for user 110's reading cadence, as well as the duration of pauses (indicated by "Π") at the commas and the question mark, respectively.

Note that whereas phrasing graph 403 is a graphical representation of user 110's phrasing when reading text 401, it will be appreciated that the user phrasing signature, and the reference phrasing signature, may be cast into a mathematical representation which is suitable for quantifying a correlation between the two.

More specifically, computing device 100 or 200 may be operative to derive the user phrasing signature from the acquired representation of user 110 subvocalizing the part of first text 131/401 by identifying syllables and pauses in the acquired representation, determining respective durations of the identified syllables and pauses, and deriving the user phrasing signature as a sequence of the determined durations of the syllables and pauses. For instance, the user phrasing signature may be represented by a time-dependent function, or a signal, which assumes a value of one ("1") during utterance of a syllable by user 110, and a value of zero ("0") during a pause between syllables, a pause between words, or a pause due to a punctuation mark. An example 404 of such a function, corresponding to phrasing graph 403, is illustrated in FIG. 4. It will be appreciated that numerous mathematical representations of the user phrasing signature and the reference phrasing signature may be envisaged, and the embodiments of the invention are not limited to the particular form 404 of the phrasing signature illustrated in FIG. 4.

Correspondingly, computing device 100/200 may be operative to derive the reference phrasing signature by identifying syllables and pauses in first text 131/401, acquiring respective durations of syllables and pauses, and deriving the reference phrasing signature as a sequence of the reference durations of the syllables and pauses. The reference phrasing signature is derived in a correspondence with user phrasing signature 404 as is described hereinbefore, i.e., as a time-dependent function or a signal, and is suitable for calculating the correlation between the user phrasing signature and the reference phrasing signature. The reference durations of the syllables and pauses (between syllables or words, and due to punctuation marks) are user specific and constitute a user-specific subvocalization signature, or a user-specific subvocalization fingerprint, and may either be acquired from a storage, i.e., a memory, of computing device 100/200, or from an external database. Preferably, the reference durations of the syllables and pauses are derived by computing device 100/200 during a learning or training phase by acquiring representations of user 110 subvocalizing text. The text may either be displayed by computing device 100/200 or provided by any other means, e.g., as a printed paper copy. Preferably, the text is composed so as to facilitate deriving of the reference durations of the syllables and pauses. More specifically, computing device 100/200 is operative to identify syllables and pauses in the acquired representations, determine respective durations of the identified syllables and pauses, and store the determined durations of syllables and pauses as the reference durations of syllables and pauses, in a storage comprised in computing device 100/200 or in an external database. The stored reference durations of syllables and pauses constitute a user-specific subvocalization signature, or a user-specific subvocalization fingerprint. Optionally, the reference durations of syllables and pauses may be dependent on a type of text. This is advantageous in that the acquired user subvocalization typically depends on the type of first text 131, since people tend to read different types of texts with different phrasing. For instance, technical or legal texts are oftentimes read more carefully, and consequently slower, than, e.g., news articles.

Computing device 100/200 may further be operative to determine that the user phrasing signature and the reference phrasing signature fulfil a similarity condition by calculating a correlation between the user phrasing signature and at least a consecutive part of the reference phrasing signature, and determining that the user phrasing signature and the reference phrasing signature fulfil the similarity condition if the calculated correlation exceeds a first threshold value.

As is known in the art, correlation is a statistical relationship which reflects the extent to which two random variables, e.g., two time-dependent functions or signals, such as the user phrasing signature and the reference phrasing signature, overlap. The correlation between two random variables is commonly referred to as cross-correlation and can be quantified by means of a correlation function, which can be expressed as an integral over the two random variables over time. Typically, correlation functions are normalized such that a perfect correlation between the two random variables, i.e., the two random variables are identical, result in a maximum value which oftentimes is chosen to be equal to one ("1"). Correspondingly, the correlation of two completely independent random variables yields a correlation value of zero ("0"). An example is the well-known Pearson product-moment correlation coefficient.

To this end, the correlation between the user phrasing signature and the reference phrasing signature, which both are represented as time-dependent functions, or signals, is calculated. In the field of signal processing, this is also referred to as the sliding dot-product or the sliding inner-product, and is commonly used for searching a long signal for a shorter feature. For embodiments of the invention, the user phrasing signature is typically shorter than the reference phrasing signature, as the latter represents the entire first text 131 displayed to user 110, whereas user 110 may have read and subvocalized only a part of first text 131. The subvocalized part of first text 131 may be identified by "sliding" the user phrasing signature over the reference phrasing signature, i.e., by varying a shift in time between the two, so as to identify the value for the time shift which maximizes the correlation between a consecutive part of the reference phrasing signature having a duration corresponding to that of the derived user phrasing signature, and the reference phrasing signature. The obtained value for the time shift which maximizes the calculated correlation may be used as an indication of the location in first text 131 where user 110 has started reading. Oftentimes, user 110 starts reading at the beginning of first text 131, but not necessarily.

Optionally, computing device 100/200 may be operative to calculate the correlation between the user phrasing signature and the entire reference phrasing signature, rather than a consecutive part of it, and determine that the user has read the first text substantially in its entirety if the calculated correlation exceeds a second threshold value. Advantageously, this can be utilized for determining that a user actually has read a text in its entirety, rather than just glancing at it.

Preferably, suitable values for the first threshold value and/or the second threshold value may be obtained during a learning or training phase during which user 110 is instructed to subvocalize one or more texts which preferably are dedicated for the purpose of configuring the first and/or the second threshold value. For instance, this may be achieved by using an upper bound, an average value, or any other suitable value, of correlation values which are observed during the learning phase. Optionally, the first and the second threshold value may be equal. It will be appreciated that the values used for the first and/or second threshold value may be selected based on a required level of security. To this end, a higher value corresponds to a higher level of security, as a higher value of correlation between the user phrasing signature and the reference phrasing signature indicates a higher degree of similarity between the two.

Optionally, computing device 100/200 may further be operative to determine, in response to authenticating user 110, if user 110 is authorized to read first text 131. Preferably, the determination may be based on permission information associated with first text 131. The permission information may, e.g., be encoded as metadata and stored in a document comprising first text 131, or stored separately in an external database.

Figure 5A:
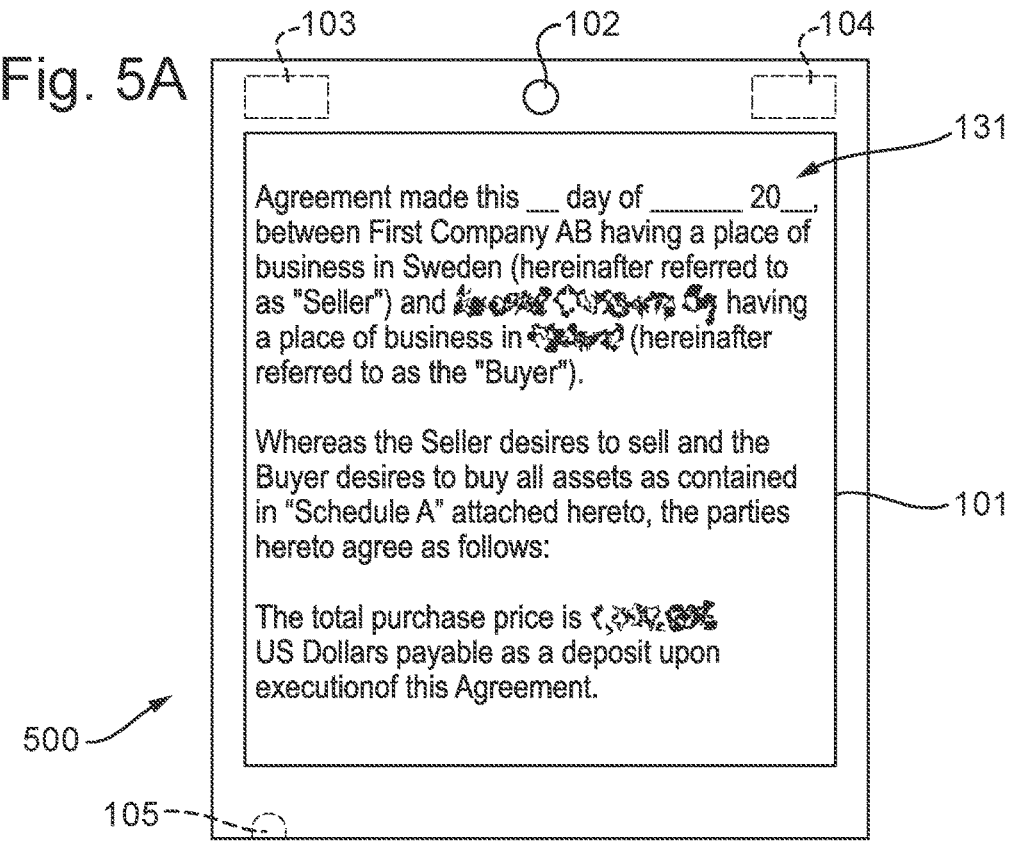
FIGS. 5A and 5B illustrate obfuscating at least parts of the first text, in accordance with embodiments of the invention.
Figure 5B:
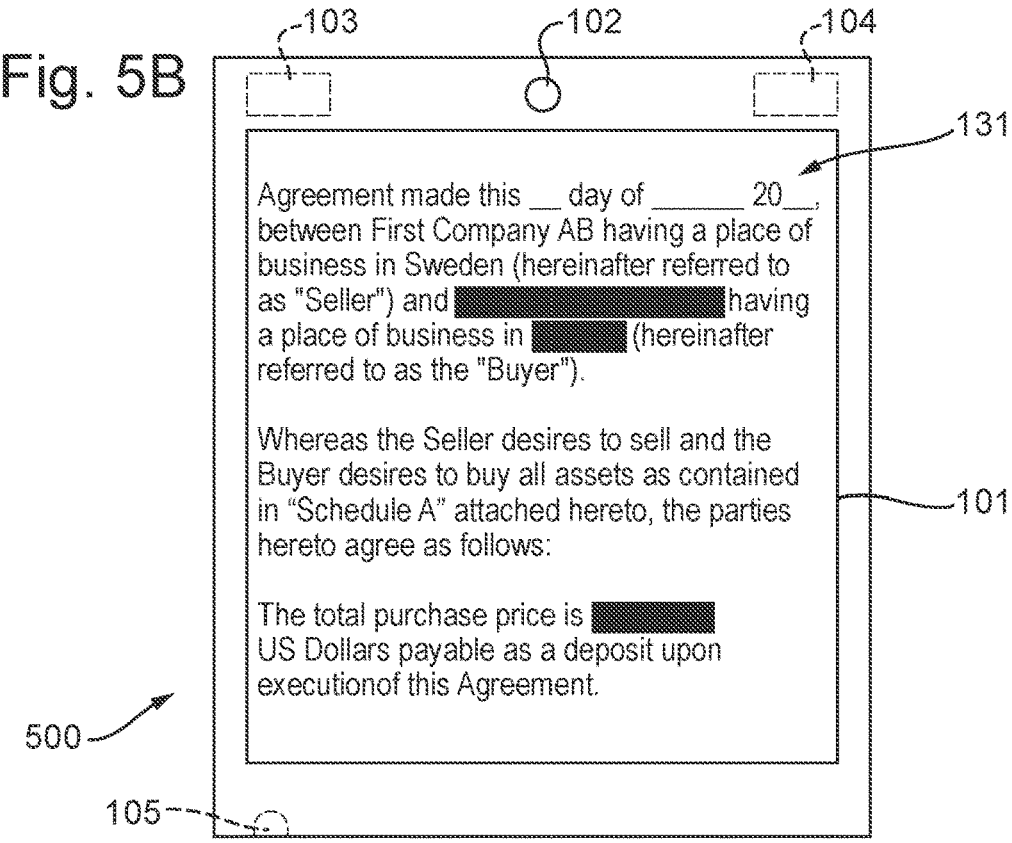

In FIGS. 5A and 5B, a further embodiment 500 of the computing device for authenticating a user of the computing device is illustrated. Computing device 500 is similar to computing devices 100 and 200 described hereinbefore, but is additionally operative to reveal obfuscated parts of first text 131 in response to determining that user 110 is authorized to read first text 131. For instance, parts of first text 131 may initially be blurred or blocked when first text 131 is displayed, as is illustrated in FIGS. 5A and 5B, respectively. Once user 110 is authenticated as a user who is authorized to read first text 131, the obfuscated parts are revealed.

Alternatively, or additionally, computing device 500 may be operative to discontinue displaying first text 131, or to obfuscate at least part of first text, in response to determining that user 110 is not authorized to read first text 131, or in response to determining that the user phrasing signature and the reference phrasing signature fail to fulfil the similarity condition. For instance, parts of first text 131 may be blurred or blocked, as is illustrated in FIGS. 5A and 5B, respectively, in response to determining that user 110 is not authorized to read first text 131 or that the similarity condition is not fulfilled. In other words, first text 131, which may be confidential, is displayed until an attempt to authenticate user 110 has failed, or until it has been determined that the authenticated user 110 is not authorized to read first text 131.

Figure 6:
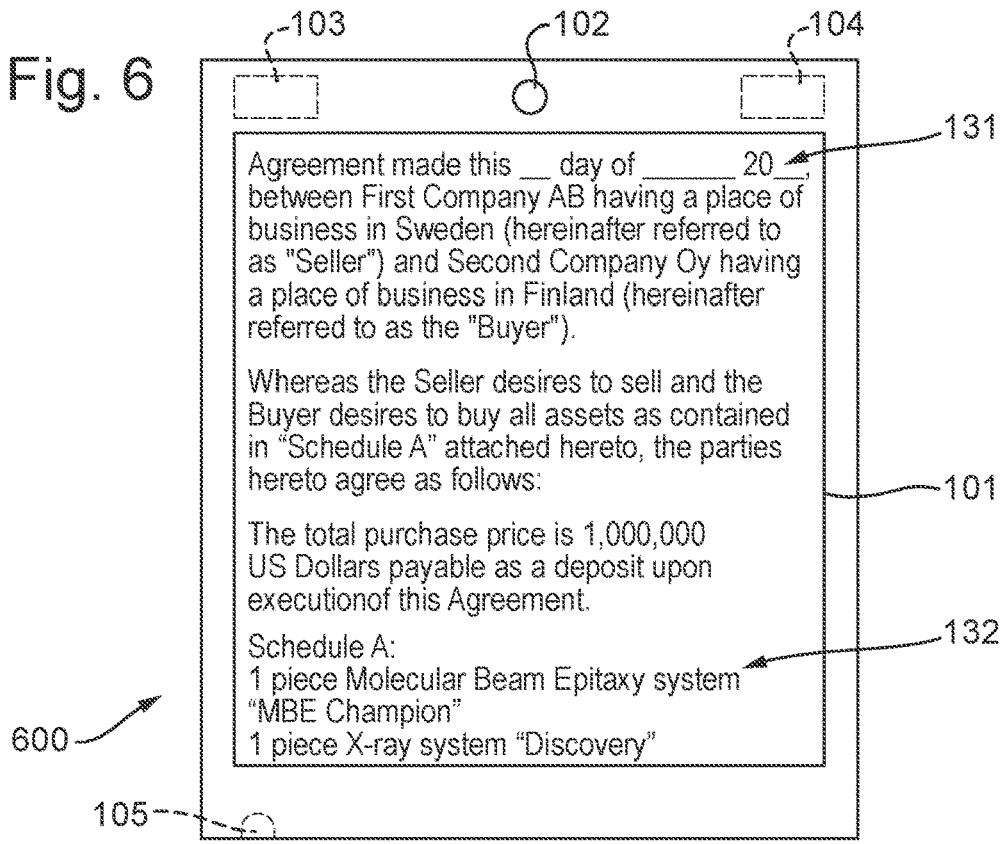
FIG. 6 illustrates displaying a second text, in accordance with embodiments of the invention.

Yet another embodiment 600 of the computing device for authenticating a user of the computing device is illustrated in FIG. 6. Computing device 600 is similar to computing devices 100, 200, and 500, described hereinbefore, but is additionally operative to display a second text 132 to user 110 in response to determining that user 110 is authorized to read first text 131. Preferably, second text 132 is displayed in response to detecting that user 110 subvocalizes a closing part of first text 131, i.e., is about to finish reading first text 131. This can be achieved by calculating a correlation between the user phrasing signature and a trailing part of the reference phrasing signature, and determining that a closing part of first test 131 has been read if the calculated correlation exceeds a threshold value, e.g., the first threshold value.

Figure 7:
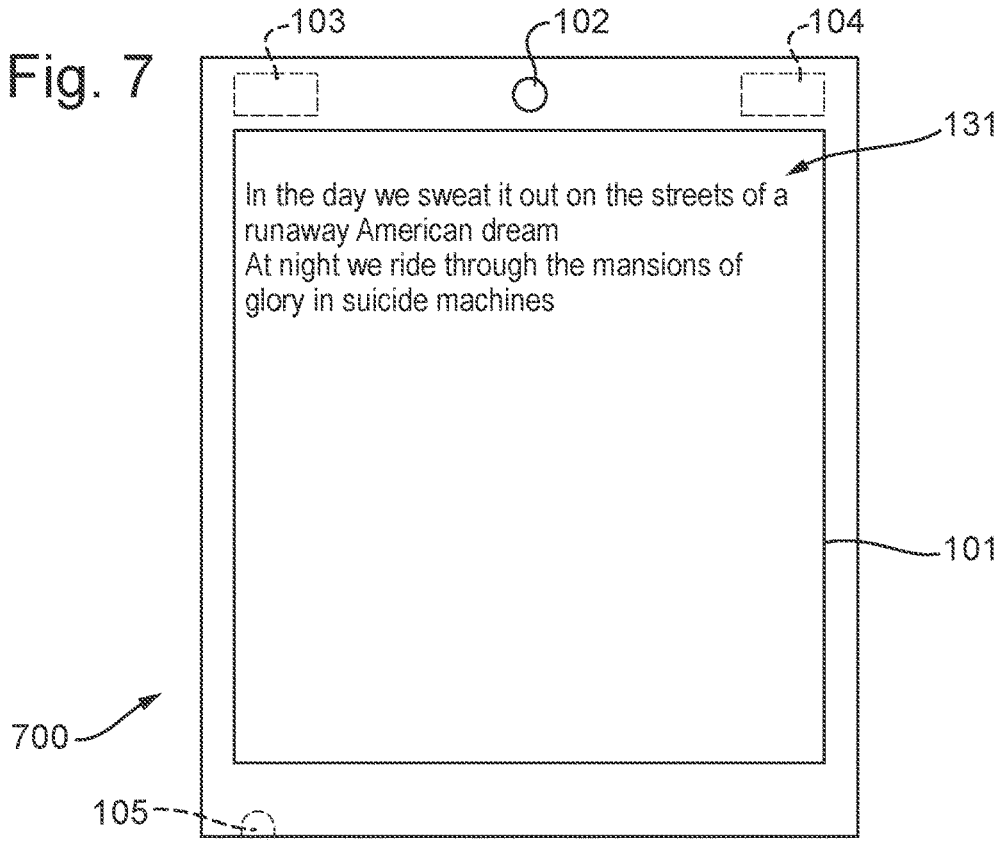
FIG. 7 illustrates displaying a text for authenticating a user, in accordance with embodiments of the invention.

In FIG. 7, yet a further embodiment 700 of the computing device for authenticating a user of the computing device is illustrated. Computing device 600 is similar to computing devices 100, 200, 500, and 600, described hereinbefore, but is additionally operative to authenticate user 110 when attempting to access, i.e., to log into, computing device 700. This may be achieved by displaying first text 131 on a login screen displayed by computing device 700, and granting access to computing device 700 in response to authenticating user 110, as is described hereinbefore. Preferably, first text 131 may be composed so as to emphasize differences in phrasing between users, e.g., by using specific words or arrangements of words in composing first text 131.

Whereas computing devices 100, 200, 500, 600, and 700, (in the following referred to as 100-700), are in the drawings illustrated as tablets or smartphones, embodiments of the invention may alternatively be embodied as a mobile phone, a mobile terminal, a personal computer, a laptop, an e-book reader, a computer display, a television, or a media player.

In the following, embodiments of processing means 103, comprised in embodiments 100-700 of the computing device for authenticating a user of the computing device, are described with reference to FIGS. 8 and 9.

Figure 8:
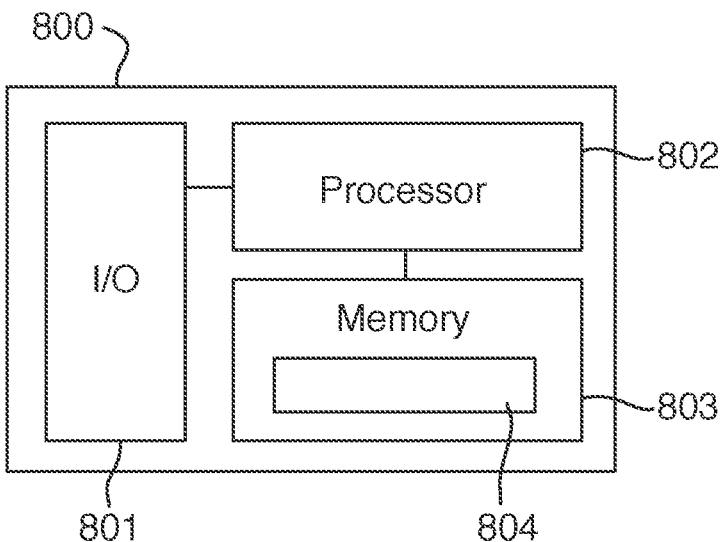
FIG. 8 shows an embodiment of the processing means comprised in the computing device for authenticating a user.

In FIG. 8, a first embodiment 800 of processing means 103 is shown. Processing means 800 comprises a processing unit 802, such as a general purpose processor, and a computer-readable storage medium 803, such as a Random Access Memory (RAM), a Flash memory, or the like. In addition, processing means 800 comprises one or more interfaces 801 ("I/O" in FIG. 8) for controlling and/or receiving information from other components comprised in computing device 100-700, such as display 101, camera 102, communications module 104, and interface 105 for external devices. In particular, interface(s) 801 may be operative to acquire, from one or more sensors 120 operatively connected to computing device 100, nerve signals captured from throat 111 of user 110 subvocalizing a part of first text 131. Alternatively, interface(s) 801 may be operative to acquire, from camera 102, a video sequence of user 110 subvocalizing a part of first text 131. Memory 803 contains computer-executable instructions 804, i.e., a computer program, for causing computing 100-700 device to become operative to perform in accordance with embodiments of the invention as described herein, when computer-executable instructions 804 are executed on processing unit 802.

Figure 9:
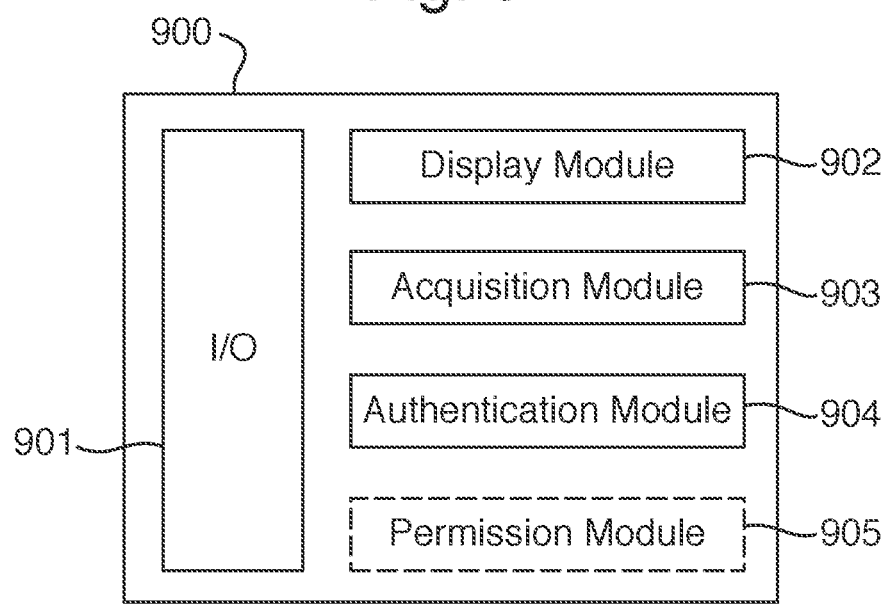
FIG. 9 shows another embodiment of the processing means comprised in the computing device for authenticating a user.

In FIG. 9, an alternative embodiment 900 of processing means 103 is illustrated. Similar to processing means 800, processing means 900 comprises one or more interfaces 901 ("I/O" in FIG. 9) for controlling and/or receiving information from other components comprised in the computing device, such as display 101, camera 102, communications module 104, and interface 105 for external devices. In particular, interface(s) 801 may be operative to acquire, from one or more sensors 120 operatively connected to computing device 100, nerve signals captured from throat 111 of user 110 subvocalizing a part of first text 131. Alternatively, interface(s) 801 may be operative to acquire, from camera 102, a video sequence of user 110 subvocalizing a part of first text 131. Processing means 900 further comprises a display module 902, an acquisition module 903, an authentication module 904, and an optional permission module 905, which are configured to cause computing device 100-700 to perform in accordance with embodiments of the invention as described herein.

In particular, display module 902 is configured to display first text 131 to user 110, acquisition module 903 is configured to acquire a representation of user 100 subvocalizing at least a part of first text 131 and derive a user phrasing signature from the acquired representation, and authentication module 904 is configured to authenticate user 110 in response to determining that the user phrasing signature and a reference phrasing signature fulfil a similarity condition.

Acquisition module 903 may be configured to acquire the representation of user 110 subvocalizing at least a part of first text 131 by acquiring, from one or more sensors 120 operatively connected to computing device 100-700, nerve signals captured from a throat 111 of user 110 subvocalizing the part of first text 131, and deriving the representation of user 110 subvocalizing at least a part of first text 131 as a representation of the nerve signals. Alternatively, acquisition module 903 may be configured to acquire the representation of user 110 subvocalizing at least a part of first text 131 by acquiring, from camera 102 operatively connected to computing device 100-700, a video sequence of user 110 subvocalizing the part of first text 131, magnifying, by video processing the acquired video sequence, motions of one or more body parts 111-115 of user 110, which motions are correlated with the subvocalized part of first text 131, and deriving the representation of the user subvocalizing at least a part of the first text as a representation of the magnified motions.

Acquisition module 903 may be configured to derive the user phrasing signature from the acquired representation by identifying syllables and pauses in the acquired representation, determining respective durations of the identified syllables and pauses, and deriving the user phrasing signature as a sequence of the determined durations of the syllables and pauses.

Acquisition module 903 may further be configured to identify syllables and pauses in first text 131, acquire reference durations of syllables and pauses, and derive the reference phrasing signature as a sequence of the reference durations of the identified syllables and pauses. Optionally, acquisition module 903 may further be configured to derive the reference durations of syllables and pauses from acquired representations of user 110 subvocalizing text by identifying syllables and pauses in the acquired representations, determining respective durations of the identified syllables and pauses, and storing the determined durations of syllables and pauses as the reference durations of syllables and pauses. Further optionally, the reference durations of syllables and pauses are dependent on a type of text.

Authentication module 904 may be configured to determine that the user phrasing signature and the reference phrasing signature fulfil a similarity condition by calculating a correlation between the user phrasing signature and at least a consecutive part of the reference phrasing signature, and determining that the user phrasing signature and the reference phrasing signature fulfil the similarity condition if the calculated correlation exceeds a first threshold value. Optionally, authentication module 904 may be further configured to calculate the correlation between the user phrasing signature and the entire reference phrasing signature, and to determine that the user has read the first text substantially in its entirety if the calculated correlation exceeds a second threshold value.

Processing means 900 may further comprise permission module 905 which is configured to determine, in response to authenticating user 110 by authentication module 904, if user 110 is authorized to read first text 131. Preferably, permission module 905 is configured to determine if user 110 is authorized to read first text 131 based on permission information associated with first text 131.

Display module 902 may further be configured to reveal obfuscated parts of first text 131 in response to determining, by permission module 905, that user 110 is authorized to read first text 131.

Display module 902 may further be configured to discontinue displaying first text 131 or to obfuscate at least part of first text 131 in response to determining, by permission module 905, that user 110 is not authorized to read first text 131.

Display module 902 may further be configured to display to user 110 a second text 132 in response to determining, by permission module 905, that user 110 is authorized to read first text 131. Preferably, display module 902 is configured to display second text 132 in response to detecting that user 110 subvocalizes a closing part of first text 131.

Display module 902 may further be configured to discontinue displaying first text 131 or to obfuscate at least part of first text 131 in response to determining, by authentication module 904, that the user phrasing signature and the reference phrasing signature fail to fulfil the similarity condition.

Interface(s) 801 and 901, and modules 902-905, as well as any additional modules comprised in processing means 900, may be implemented by any kind of electronic circuitry, e.g., any one, or a combination of, analogue electronic circuitry, digital electronic circuitry, and processing means executing a suitable computer program.

In the following, embodiments 1000 of the method of authenticating a user 110 of a computing device are described with reference to FIG. 10, in accordance with embodiments of the invention. An embodiment of method 1000 may be performed by a computing device such as a mobile phone, a mobile terminal, a smartphone, a tablet, a personal computer, a laptop, an e-book reader, a computer display, a television, or a media player.

Method 1000 comprises displaying 1001 a first text to the user, acquiring 1002 a representation of the user subvocalizing at least a part of the first text, deriving 1003 a user phrasing signature from the acquired representation, and authenticating 1005 the user in response to determining 1004 that the user phrasing signature and a reference phrasing signature fulfil a similarity condition.

Acquiring 1002 the representation of the user subvocalizing at least a part of the first text may comprise acquiring, from one or more sensors operatively connected to the computing device, nerve signals captured from a throat of the user subvocalizing the part of the first text, and deriving the representation of the user subvocalizing at least a part of the first text as a representation of the nerve signals. Alternatively, acquiring 1002 the representation of the user subvocalizing at least a part of the first text may comprise acquiring, from a camera operatively connected to the computing device, a video sequence of the user subvocalizing the part of the first text, magnifying, by video processing the acquired video sequence, motions of one or more body parts of the user, which motions are correlated with the subvocalized part of the first text, and deriving the representation of the user subvocalizing at least a part of the first text as a representation of the magnified motions.

Deriving 1003 the user phrasing signature from the acquired representation may comprise identifying syllables and pauses in the acquired representation, determining respective durations of the identified syllables and pauses, and deriving the user phrasing signature as a sequence of the determined durations of the syllables and pauses.

Method 1000 may further comprise deriving the reference phrasing signature by identifying syllables and pauses in the first text, acquiring reference durations of syllables and pauses, and deriving the reference phrasing signature as a sequence of the reference durations of the syllables and pauses. Preferably, method 1000 further comprises deriving the reference durations of syllables and pauses from acquired representations of the user subvocalizing text by identifying syllables and pauses in the acquired representations, determining respective durations of the identified syllables and pauses, and storing the determined durations of syllables and pauses as the reference durations of syllables and pauses. Optionally, the reference durations of syllables and pauses are dependent on a type of text.

Determining 1004 that the user phrasing signature and the reference phrasing signature fulfil a similarity condition may comprise calculating a correlation between the user phrasing signature and the reference phrasing signature, and determining that the user phrasing signature and the reference phrasing signature fulfil the similarity condition if the calculated correlation exceeds a threshold value. Optionally, the correlation is calculated between the user phrasing signature and the entire reference phrasing signature, and method 1000 further comprises determining that the user has read the first text substantially in its entirety if the calculated correlation exceeds a second threshold value.

Optionally, method 1000 may further comprises determining 1010, in response to authenticating 1005 the user, if the user is authorized to read the first text. Preferably, it is determined 1010 that the user is authorized to read the first text based on permission information associated with the first text.

Optionally, method 1000 further comprises revealing 1011 obfuscated parts of the first text in response to determining 1010 that the user is authorized to read the first text.

Optionally, method 1000 further comprises displaying 1012 to the user a second text in response to determining 1010 that the user is authorized to read the first text. Preferably, the second text is displayed 1012 in response to detecting that the user subvocalizes a closing part of the first text.

Optionally, method 1000 further comprises discontinuing 1013 displaying the first text or obfuscating 1013 at least part of the first text in response to determining 1010 that the user is not authorized to read the first text, or in response to determining 1004 that the user phrasing signature and the reference phrasing signature fail to fulfil the similarity condition.

It will be appreciated that method 1000 may comprise additional, or modified, steps in accordance with what is described throughout this disclosure. An embodiment of method 1000 may be implemented as software, such as computer program 804, to be executed by a processing unit comprised in the computing device, whereby the computing device becomes operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. A computing device for authenticating a user of the computing device, the computing device comprising processing circuitry configured to:
   display a first text to the user,
   acquire, from a camera operatively connected to the computing device, a video sequence of the user subvocalizing at least part of the first text,
   magnify, by video processing the acquired video sequence, motions of one or more body parts of the user, which motions are correlated with the subvocalized at least part of the first text, and
   derive a representation of the user subvocalizing at least part of the first text as a representation of the magnified motions from the video processing of the acquired video sequence,
   derive a user phrasing signature by identifying a sequence of durations of pauses in the derived representation of the magnified motions from the video processing of the acquired video sequence, and
   authenticate the user in response to determining that the user phrasing signature and a reference phrasing signature fulfil a similarity condition, wherein the reference phrasing signature is derived from a previously acquired video sequence from the camera or another camera of the user subvocalizing the at least part of the first text.

2. The computing device according to claim 1, the processing circuitry is further configured to derive the user phrasing signature from the acquired representation by:
   identifying syllables and the pauses in the derived representation,
   determining respective durations of the identified syllables and pauses, and
   deriving the user phrasing signature based on a sequence of the determined durations of the syllables and pauses.

3. The computing device according to claim 1, the processing circuitry is further configured to derive the reference phrasing signature by:
   identifying syllables and pauses in the first text,
   acquiring reference durations of syllables and pauses, and
   deriving the reference phrasing signature as a sequence of the reference durations of the identified syllables and pauses.

4. The computing device according to claim 3, the processing circuitry is further configured to acquire the reference durations of syllables and pauses from acquired representations of the user subvocalizing text by:
   identifying syllables and pauses in the acquired representations of the user subvocalizing text,
   determining respective durations of the identified syllables and pauses, and
   storing the determined durations of the identified syllables and pauses as the reference durations of syllables and pauses.

5. The computing device according to claim 3, wherein the reference durations of syllables and pauses are dependent on a type of text.

6. The computing device according to claim 1, the processing circuitry is further configured to determine that the user phrasing signature and the reference phrasing signature fulfil the similarity condition by:
   calculating a correlation between the user phrasing signature and at least a consecutive part of the reference phrasing signature, and
   determining that the user phrasing signature and the reference phrasing signature fulfil the similarity condition responsive to the calculated correlation exceeding a first threshold value.

7. The computing device according to claim 6, the processing circuitry is further configured to calculate the correlation between the user phrasing signature and the entire reference phrasing signature, the processing circuitry is further configured to determine that the user has read the first text substantially in its entirety if the calculated correlation exceeds a second threshold value.

8. The computing device according to claim 1, the processing circuitry is further configured to determine, in response to authenticating the user, if the user is authorized to read the first text.

9. The computing device according to claim 8, the processing circuitry is further configured to determine if the user is authorized to read the first text based on permission information associated with the first text.

10. The computing device according to claim 8, the processing circuitry is further configured to reveal obfuscated parts of the first text in response to determining that the user is authorized to read the first text.

11. The computing device according to claim 8, the processing circuitry is further configured to discontinue displaying the first text or to obfuscate at least part of the first text in response to determining that the user is not authorized to read the first text.

12. The computing device according to claim 8, the processing circuitry is further configured to display to the user a second text in response to determining that the user is authorized to read the first text.

13. The computing device according to claim 12, the processing circuitry is further configured to display the second text in response to detecting that the user subvocalizes a closing part of the first text.

14. The computing device according to claim 1, the processing circuitry is further configured to discontinue displaying the first text or to obfuscate at least part of the first text in response to determining that the user phrasing signature and the reference phrasing signature fail to fulfil the similarity condition.

15. The computing device according to claim 1, being any one of: a mobile phone, a mobile terminal, a smartphone, a tablet, a personal computer, a laptop, an e-book reader, a computer display, a television, and a media player.

16. A method of authenticating a user of a computing device, the method comprising:
displaying a first text to the user,
acquiring, from a camera operatively connected to the computing device, a video sequence of the user subvocalizing at least part of the first text,
magnifying, by video processing the acquired video sequence, motions of one or more body parts of the user, which motions are correlated with the subvocalized at least part of the first text, and
deriving a representation of the user subvocalizing at least part of the first text as a representation of the magnified motions from the video processing of the acquired video sequence,
deriving a user phrasing signature by identifying a sequence of durations of pauses in the derived representation of the magnified motions from the video processing of the acquired video sequence, and
authenticating the user in response to determining that the user phrasing signature and a reference phrasing signature fulfil a similarity condition, wherein the reference phrasing signature is derived from a previously acquired video sequence from the camera or another camera of the user subvocalizing the at least part of the first text.

17. The method according to claim 16, wherein the deriving the user phrasing signature from the derived representation comprises:
identifying syllables and the pauses in the derived representation,
determining respective durations of the identified syllables and pauses, and
deriving the user phrasing signature based on a sequence of the determined durations of the syllables and pauses.

18. The method according to claim 16, further comprising deriving the reference phrasing signature by:
identifying syllables and pauses in the first text,
acquiring reference durations of syllables and pauses, and
deriving the reference phrasing signature as a sequence of the reference durations of the identified syllables and pauses.

19. The method according to claim 18, further comprising acquiring the reference durations of syllable and pauses from acquired representations of the user subvocalizing text by:
identifying syllables and pauses in the acquired representations,
determining respective durations of the identified syllables and pauses of the user subvocalizing text, and
storing the determined durations of the identified syllables and pauses as the reference durations of syllables and pauses.

20. The method according to claim 18, wherein the reference durations of syllables and pauses are dependent on a type of text.

21. The method according to claim 16, wherein the determining that the user phrasing signature and the reference phrasing signature fulfil the similarity condition comprises:
calculating a correlation between the user phrasing signature and the reference phrasing signature, and
determining that the user phrasing signature and the reference phrasing signature fulfil the similarity condition responsive the calculated correlation exceeding a threshold value.

22. The method according to claim 21, wherein the correlation is calculated between the user phrasing signature and the entire reference phrasing signature, the method further comprising determining that the user has read the first text substantially in its entirety if the calculated correlation exceeds a second threshold value.

23. The method according to claim 16, further comprising determining, in response to authenticating the user, if the user is authorized to read the first text.

24. The method according to claim 23, wherein it is determined that the user is authorized to read the first text based on permission information associated with the first text.

25. The method according to claim 23, further comprising revealing obfuscated parts of the first text in response to determining that the user is authorized to read the first text.

26. The method according to claim 23, further comprising discontinuing displaying the first text or obfuscating at least part of the first text in response to determining that the user is not authorized to read the first text.

27. The method according to claim 23, further comprising displaying to the user a second text in response to determining that the user is authorized to read the first text.

28. The method according to claim 27, wherein the second text is displayed in response to detecting that the user subvocalizes a closing part of the first text.

29. The method according to claim 16, further comprising discontinuing displaying the first text or obfuscating at least part of the first text in response to determining that the user phrasing signature and the reference phrasing signature fail to fulfil the similarity condition.

30. A computer program product comprising a non-transitory computer-readable storage medium storing computer-executable instructions for causing a device to perform the method according to claim 16, when the computer-executable instructions are executed on a processing circuitry comprised in the device.

31. A computing device for authenticating a user of the computing device, the computing device comprising processing circuitry configured to:
display a first text to the user,
acquire, from a camera operatively connected to the computing device, a video sequence of the user subvocalizing at least part of the first text,
magnify, by video processing the acquired video sequence, motions of one or more body parts of the user, which motions are correlated with the subvocalized at least part of the first text, and
derive a representation of the user subvocalizing at least part of the first text as a representation of the magnified motions from the video processing of the acquired video sequence, derive a user phrasing signature from the derived representation of the magnified motions from the video processing of the acquired video sequence, derive a reference phrasing signature by identifying pauses in the first text, acquiring reference durations of the pauses from a previously acquired video sequence from the camera or another camera of the user subvocalizing the at least part of the first text, and deriving the reference phrasing signature as a sequence of the reference durations of the identified pauses, and authenticate the user in response to determining that the user phrasing signature and the reference phrasing signature fulfil a similarity condition.

32. The computing device according to claim 1, wherein the authentication of the user is performed without use of an audio sequence of the user vocalizing the at least part of the first text and without use of another reference phrasing signature based on a previously acquired audio sequence of the user vocalizing the at least part of the first text.

\* \* \* \* \*